United States Patent [19]
Elsner et al.

[11] Patent Number: 6,165,300
[45] Date of Patent: Dec. 26, 2000

[54] PROCESS FOR MANUFACTURING COMPOSITE BODIES MADE OF PLASTICS

[75] Inventors: Peter Elsner, Pfinztal; Adam Geissler, Neuthard; Rudolf Emmerich, Bruchsal; Michael Zürn, Sindelfingen; Peter Eyerer, Karlsruhe; Lars Ziegler, Leonberg; Maik Ziegler, Weissach, all of Germany

[73] Assignee: Fraunhofer-Gesellschaft zur Förderung der angewandten Forschung e.V., München, Germany

[21] Appl. No.: 09/230,539

[22] PCT Filed: Aug. 18, 1997

[86] PCT No.: PCT/EP97/04490

§ 371 Date: Jan. 28, 1999

§ 102(e) Date: Jan. 28, 1999

[87] PCT Pub. No.: WO98/07555

PCT Pub. Date: Feb. 26, 1998

[30]       Foreign Application Priority Data

Aug. 20, 1996  [DE]  Germany ............................ 196 33 467
Oct. 29, 1996  [DE]  Germany ............................ 196 44 823

[51] Int. Cl.⁷ .............................. B32B 5/18; B32B 31/28; H05B 6/64
[52] U.S. Cl. .......................... 156/78; 156/79; 156/272.2; 156/309.6; 264/417; 264/420; 264/489
[58] Field of Search .................................. 156/77, 78, 79, 156/272.2, 273.3, 309.6; 264/417, 418, 420, 421, 489; 219/710, 730, 750

[56]            References Cited

U.S. PATENT DOCUMENTS

| 3,420,923 | 1/1969 | Ashworth et al. . |
| 3,816,574 | 6/1974 | Heller . |
| 3,902,940 | 9/1975 | Heller . |
| 4,097,319 | 6/1978 | Shimokawa et al. . |
| 4,134,942 | 1/1979 | Mirr et al. . |
| 4,302,272 | 11/1981 | Phillips et al. . |
| 4,352,854 | 10/1982 | Siedenstrang . |
| 5,064,867 | 11/1991 | Barringer et al. . |

FOREIGN PATENT DOCUMENTS

| 07 05 682 | 4/1996 | European Pat. Off. . |
| 15 04 412 | 10/1969 | Germany . |
| 35 31 606 | 8/1986 | Germany . |
| 14 91 532 | 11/1977 | United Kingdom . |
| 2182599 | 5/1987 | United Kingdom . |
| WO 90 08642 | 8/1990 | WIPO . |

Primary Examiner—Michael W. Ball
Assistant Examiner—John T. Haran
Attorney, Agent, or Firm—Paul Vincent

[57]            ABSTRACT

In order to manufacture compound composite bodies having at least two layers with a support material made completely or substantially from a polymer and with a porous layer firmly connected thereto, a substantially microwave-permeable polymer is utilized for the support material and a polymer having microwave absorbing properties is utilized for the porous layer. The polymer for the porous layer, treated with foaming agent, is heated with microwave energy up to the decomposition temperature of the foaming agent. The resulting polymer foam is sufficiently heated using microwave energy that the support material, at its bordering layer adjacent the foamed polymer, is sufficiently melted substantially due to heat conduction out of the foamed layer that, subsequent to cooling, a firm composite between the support material and the foamed polymer is effected. The porous layer can also consist essentially of polymer particles which melt together during the MW-irradiation and which are either pre-expanded or expanded during MW-irradiation through foaming agent additive.

30 Claims, 3 Drawing Sheets

PROCESS FOR MANUFACTURING COMPOSITE BODIES MADE OF PLASTICS

BACKGROUND OF THE INVENTION

The invention concerns a method for the manufacture of at least two-layered composite bodies having a support material completely or primarily comprising plastic and with a porous layer made from expanded polymer firmly attached thereto, in that a polymer treated with foaming agent is heated with microwave energy up to the melting temperature of the polymer with simultaneous decomposition or evaporation of the foaming agent, with the resulting expanded polymer being connected to the support material.

Composite bodies of the above mentioned kind have a plurality of practical applications, e.g. as heat and acoustic insulation materials in building construction and renovation, in motor vehicle chassis construction etceteras. To the extent that such composite bodies are utilized for base materials for the internal lining of motor vehicles, not only the acoustical insulation properties but, in particular, the cushioning properties of the porous layer are used for safety reasons. Another application is acoustical and heat insulation layering for machines, thermal insulation containers etceteras.

The support material and the expanded polymer are normally each manufactured separately in their desired shapes and then glued together. This is usually done using solvent to effect a surface etching of the support material and the expanded polymer leading to firm bonding. When glues are used, they normally also contain solvent. This procedure is complicated and the use of solvents causes processing and environmental problems.

WO92/08642 describes a method for the production of molded bodies from expandable polymer pellets using a microwave-absorbing medium, wherein the polymer pellets, together with the MW absorbing medium such as water, are introduced into a MW permeable mold with the mold then being closed and the polymer pellets expanded and melted together using MW energy. A variation of the method provides for the packaging of a molded body made in this manner using a liner introduced into the mold and surrounding the polymer pellets which, however, only effects an interlocking connection to the expanded polymer pellets.

A further method is described in EP 0 705 682 A1 for connecting at least two thermoplastic polymers, wherein at least one of the polymers is coated with an MW absorbing medium at least at the surface bordering the other polymer so that the polymers are welded together under contact at their bordering surfaces in a MW field by means of heat transfer from the MW absorbing medium.

It is the purpose of the present invention to propose a method for the manufacture of composite bodies of the above mentioned structure which can be carried out without the use of solvents, wherein addition of additives, such as MW absorbing media, is not necessary.

SUMMARY OF THE INVENTION

This purpose is achieved in accordance with the invention in that a microwave-permeable polymer is utilized for the support material, whereas the polymer treated with a foaming agent has microwave absorbing properties, with the polymer treated with the foaming agent being expanded solely through microwave energy and simultaneously or subsequently being heated using microwave energy until the support material melts at the bordering layer adjacent the expanded polymer due to the heat conduction out of the foamed layer, such that a firm composite between the support material and the expanded polymer is obtained subsequent to cooling.

The method in accordance with the invention utilizes MW-energy to drive the expansion process in the porous layer and to effect connection between the expanded polymer of the porous layer and the polymer of the support material without requiring an additional, in particular, solvent containing component or even pure solvent to connect these two materials. A homogeneous connection, free of foreign agents, is obtained between the two polymers contributing to the composite.

In the method in accordance with the invention, the porous layer can be produced through expansion of the polymer containing the foaming agent using MW, separately in the form of a foam body or with individual foam pearls and subsequently connected to the support material using MW. However, the polymer containing the foaming agent is preferentially freely introduced (e.g. extruded) onto the support material and expanded, if appropriate under simultaneous shaping, and connected to the polymer of the support material. GB 2 182 599 A discloses melting of particle-shaped polymers using MW-energy to form a type of sinter body. In this connection, it has been further proposed to treat the polymer with foaming agent and to not only use the MW-energy to melt together the polymer particles rather also for expansion. MW-energy has also been used in prior art for the production of welding temperatures to join foils in point welding.

The invention takes a different path in that the support material is not directly influenced by the MW-irradiation, rather only the polymer which is to be expanded and the welding or melting between the porous layer and the support material is effected solely through conduction of heat necessary therefor out of the heated polymer into the bordering layer of the support material.

A foaming agent is preferentially used whose decomposition or evaporation temperature lies above the melting temperature of the polymer utilized for the porous layer so that, when heating up to this temperature, it is assured that not only the foaming agent is activated and the polymer expanded, but that the polymer also has sufficient heat content to itself melt by means of the absorbed MW-energy and, in addition, to melt the polymer of the support material via heat conduction.

Another purpose solved by the invention involves use of a substantially microwave-permeable polymer for the support material and to use a polymer in the form of particles having microwave absorbing properties for the porous layer with the unbound composition comprising the support material and particle-shaped polymer being irradiated with microwave energy until the particles, at least on their surfaces, directly melt together and until the support material melts at the bordering layer proximate the particle-shaped polymer due to heat conduction from the particle-shaped polymer, so that a firm composite comprising the support material and the porous layer of mutually bound polymer particles is effected subsequent to cooling.

The particle-shaped polymer can be introduced in the form of expanded pearls. Alternatively, a particle-shaped polymer can be treated with a foaming agent and be expanded through irradiation of microwave-energy. It is also possible to only use pre-expanded particles and to fully expand same through MW-irradiation.

The same polymer can be utilized for both the support material and for the porous layer to create a good connection as well as a pure final product which can be easily disposed of or recycled. Towards this end, the polymer used can be substantially permeable to microwaves with only the foaming agent of the expanded polymer having MW absorbing properties.

An additional advantageous embodiment provides that irradiation with MW-energy leads to the formation of a sealed skin (integral skin) on the free surfaces of the expanded polymer.

The integral skin on the free surface of the expanded polymer either constitutes the final surface structure of the composite body or facilitates proper introduction of an additional layer, e.g. a foil, having certain physical characteristics, decorative properties or the like.

In accordance with an additional feature of the invention, the free surface of the polymer of the porous layer is partially covered with a layer impermeable to microwaves, wherein this layer can also have a changing MW-absorption coefficient in the plane of the layer.

The MW-impermeable layer leads to a masking of the underlying regions of the polymer with respect to MW-irradiation, so that the polymer is not expanded in these regions. A structure comprising solid and expanded regions thereby occurs or, if the polymer is dispensed in granulated form, the structure comprises only sintered and additional expanded structures. Use of a varying, in particular continuously varying MW-absorption coefficient facilitates production of expanded foam structures having regularly decreasing or increasing cavity volumes.

Clearly, three-layer composite bodies can also be produced using the method in accordance with the invention by introducing an additional layer made from a microwave permeable polymer onto the free surface of the polymer and binding same in a similar manner to the expanded polymer as is done with only a double-layered composite structure. The cover-layer can, in particular, be a foil.

Depending on the type of composite structure to be manufactured, the support material can be a plate or foil-shaped and preferentially consists essentially of glass mat reinforced thermoplastic. In accordance with an additional preferred embodiment of the method, the composite body is simultaneously shaped under pressure during the MW-treatment. Alternatively, one can also provide that the support material and polymer containing the foaming agent and, if appropriate, a cover-layer are preformed under pressure and the loose composition subsequently irradiated with microwaves.

The support material can also be a hollow body which can be partially filled with the polymer containing the foaming agent with same subsequently expanded using microwave energy. Such a method is particularly appropriate for sandwich coverings, in containers and the like.

The invention is described below in connection with several embodiments represented in the drawings. The drawings each show schematic cross sections of a press-shaping tool for the manufacture of a shaped composite body.

DESCRIPTION OF THE PREFERRED EMBODIMENT

Figure 1:
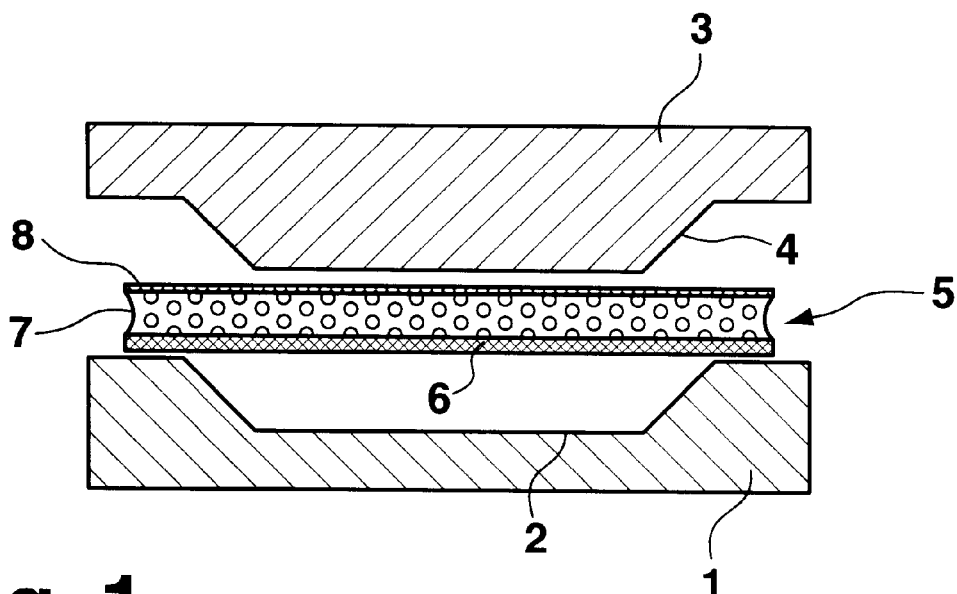
FIG. 1 shows shaping a composite material.

The same composite body forms the basis of each of the embodiments represented in the drawing, each having a substantially equivalent press-shaping tool comprising a lower tool 1 having a shaping trough 2 and an upper tool 3 with a corresponding shaping profile 4. In the embodiment in accordance with FIGS. 1 and 2, a pre-layered material composite 5 is introduced between the shaping tools 1 and 3. The material composite includes a plate-shaped support material 6, e.g. made from GMT, which constitutes the supporting component of the composite body in the final state. In addition, the composite 5 comprises a porous layer 7 having a foamed polymer and a cover layer 8 in the form of a foil also made from a polymer. The foil 8, the porous layer 7, and the plastic portion of the support material 6 are preferentially made from the same polymer. The porous layer 7 is generated from the polymer containing the foaming agent, e.g. through irradiation with microwave energy.

Figure 2:
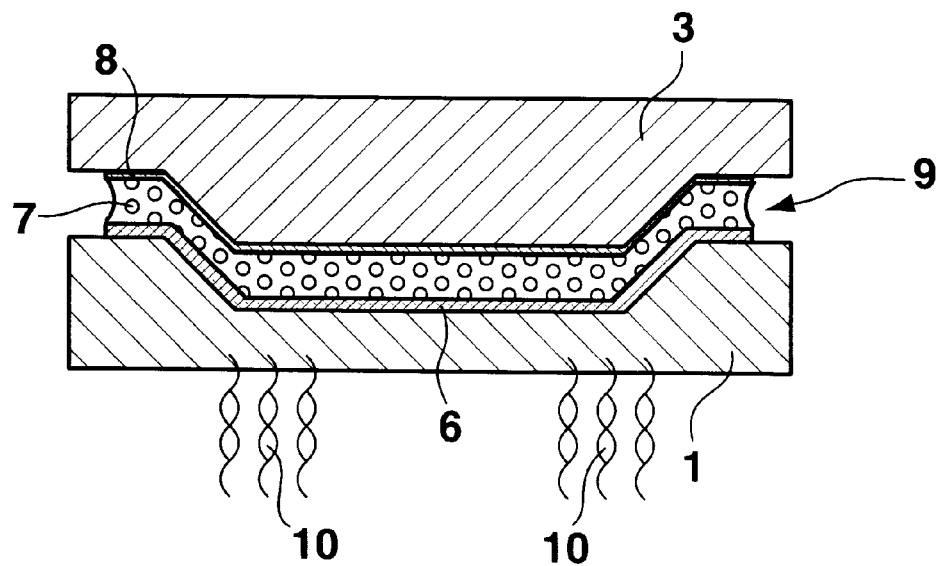
FIG. 2 shows shaping a composite material.

The composite 5 comprising the loosely stacked layers 6, 7 and 8 is introduced between the lower tool 1 and the upper tool 3 and pressed into the shape of the composite body 9 as shown in FIG. 2. Microwave energy is introduced through the tool into the composite body as indicated with reference symbol 10. Towards this end, at least the lower tool 1 is permeable to microwaves in the example shown. The support material 6 layer is also permeable to microwaves, whereas the polymer of the porous layer 7 is completely or substantially microwave-impermeable. The foil 8, for its part, is MW-permeable. This composite construction results in heating up the porous layer 7 to a sufficient extent that it melts, at least on its surface, and heat is conducted out of the porous layer 7 into its borders with the support material 6 and the foil 8 so that they melt through heat conduction alone at the surfaces bordering the porous layer 7. After cooling, a firm connection among all 3 layers is thereby established.

Figure 3:
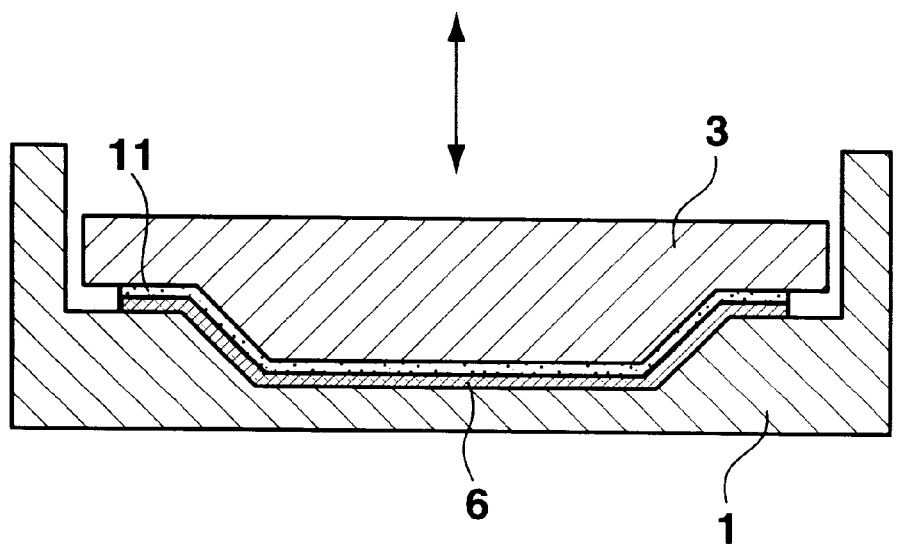
FIG. 3 shows pre-shaping and the subsequent foaming.
Figure 4:
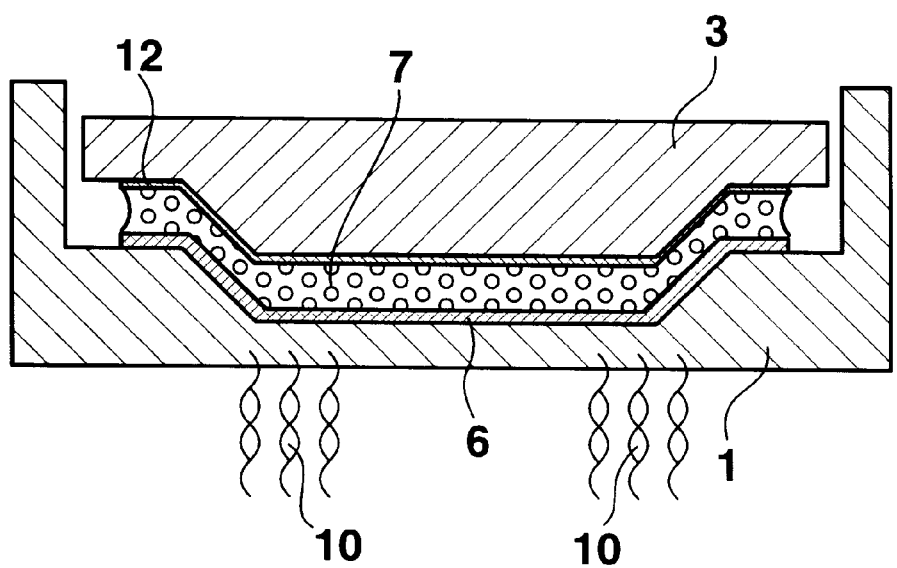
FIG. 4 shows pre-shaping and the subsequent foaming.

In the embodiment in accordance with FIG. 3, the support material 6, preferentially comprising glass mat reinforced thermoplastic, and the polymer introduced in the form of a layer 11 and treated with a foaming agent are preformed between the lower tool 1 and the upper tool 3. During this pre-shaping process, the layers seat loosely upon each other. MW-energy, indicated by reference symbol 10, is then introduced. The polymer in layer 11 is impermeable to MW so that the energy is absorbed and the foaming agent decomposed. The layer 11 expands, wherein the upper tool 3 is successively raised until the final thickness of the porous layer 7 is established. Connection between porous layer 7 and the support material 6 is simultaneously effected in the manner described in FIGS. 1 and 2. During MW-absorption, the surface of the porous layer 7 opposite the support material 6 is also melted so that an integral skin 12 is formed at the surface of the profile 4 of the upper tool 3. The formation thereof can, if appropriate, also be enhanced using conventional heating of the upper tool 3.

Figure 5:
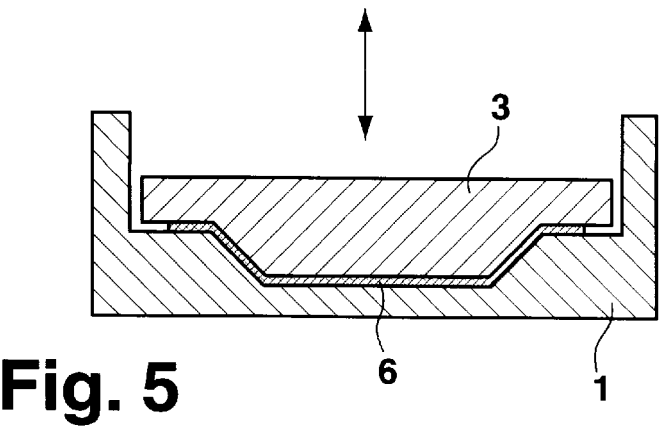
FIG. 5 shows pre-shaping of the support material and subsequent shaping of the composite body.
Figure 6:
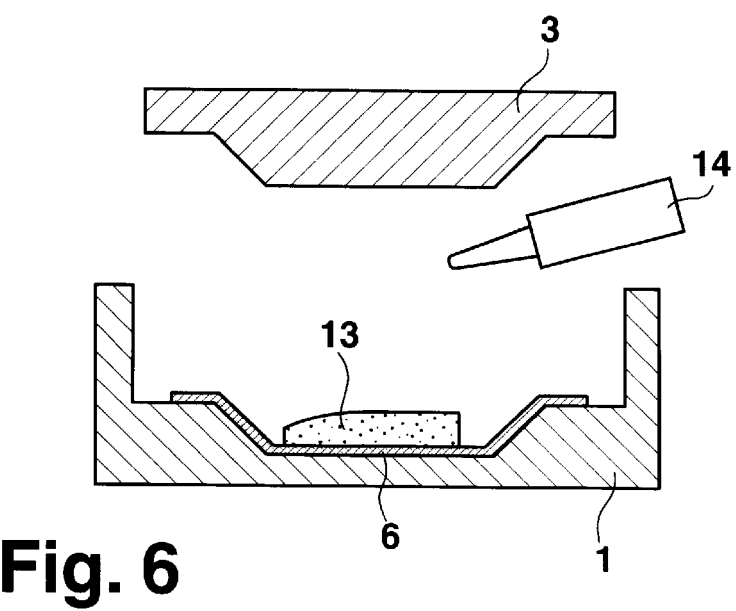
FIG. 6 shows pre-shaping of the support material and subsequent shaping of the composite body.
Figure 7:
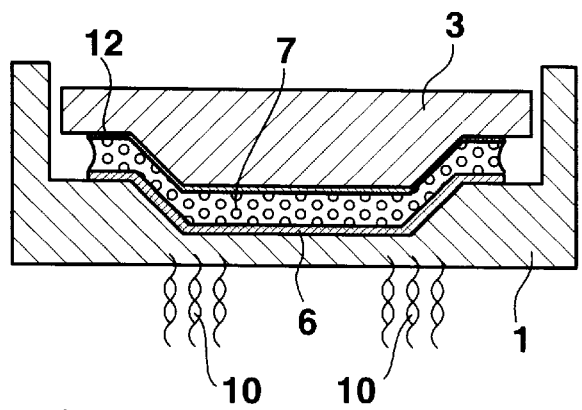
FIG. 7 shows pre-shaping of the support material and subsequent shaping of the composite body.

In the embodiment in accordance with FIGS. 5 through 7, only the support material 6 is preformed between the lower tool 1 and the upper tool 3. After the tool is opened, the polymer 13 treated with foaming agent is freely introduced onto the support material 6, e.g. directly using an extruder 14. The mold is then closed, wherein the upper tool 3 is approximately adjusted to the final thickness of the composite body relative to the lower tool 1. Introduction of MW-energy leads to expansion of the polymer 13 into the porous layer 7 which is thereby distributed evenly in the mold gap. An integral skin 12 can also thereby be formed on the side opposite the support material 6.

A foaming agent is utilized for the polymer of the porous layer 7 whose decomposition or evaporation temperature is at least somewhat above the melting point of the polymer of the support material 6 and, if appropriate, of the foil 8 so that, when the polymer is expanded, sufficient heat is conducted to at least the surfaces bordering the neighboring layers to facilitate a surface melting thereof and, after cooling, a firm composite is obtained.

The porous layer 7 can also be formed from polymer particles poured loosely into the composite or onto the support material and, through irradiation with MW-energy, connected to each other through surface melting and to the support material in the manner described above. Towards this end, a polymer can be utilized with MW-absorbing properties or one treated with an appropriate additive. Alternatively thereto and preferentially, the particles are coated with an MW-absorbing agent. In addition, the particles can be introduced in an expanded or preexpanded form or be treated with an expanding agent, with expansion first being effected through irradiation with the MW-energy.

We claim:

1. A method for manufacturing an at least two-layered composite body having a support layer consisting primarily of a microwave-permeable polymer and having a porous layer made from an expanded microwave absorbing polymer, the method comprising the steps of:
   a) treating a microwave absorbing thermoplastic polymer with a foaming agent;
   b) expanding the microwave absorbing thermoplastic polymer solely through irradiation with microwaves under decomposition or evaporation of the foaming agent to create the porous layer;
   c) melting a microwave-permeable thermoplastic polymer adjacent to the microwave absorbing thermoplastic polymer in a border region of the composite body using microwaves via heat conduction out of the microwave absorbing thermoplastic polymer;
   d) melting said microwave absorbing thermoplastic polymer in said border region using microwaves; and
   e) cooling the microwave absorbing thermoplastic polymer and the microwave-permeable thermoplastic polymer to weld together the support layer and the porous layer.

2. The method of claim 1, further comprising the step of:
   a1) bringing, following step a) and prior to step b), the microwave absorbing thermoplastic polymer into loose contact with the support layer, wherein steps b) and c) occur concurrently.

3. Method of claim 1, wherein said foaming agent has a decomposition or evaporation temperature which lies above a melting temperature region of the microwave-absorbing thermoplastic polymer.

4. The method of claim 1, wherein the support layer and the porous layer consist essentially of a same polymer.

5. The method of claim 1, wherein irradiation with MW-energy leads to formation of a closed, integral skin on a free surface of the porous layer.

6. The method of claim 1, further comprising the step of partially covering a free surface of the porous layer with a microwave impermeable layer.

7. The method of claim 1, further comprising the step of partially covering a free surface of the porous layer with a layer having a variable MW-absorption coefficient in a plane of said layer.

8. The method of claim 1, further comprising the steps of:
   introducing an additional substantially microwave-permeable thermoplastic layer onto a free surface of the porous layer; and
   welding together said additional thermoplastic layer and the porous layer through irradiation with microwave energies by melting a region of said additional thermoplastic layer bordering the porous layer.

9. The method of claim 8, wherein said additional thermoplastic layer comprises a same polymer as the porous layer.

10. The method of claim 1, wherein the support layer is a plate or a foil.

11. The method of claim 1, wherein the support layer comprises a hollow body partially filled with the microwave absorbing polymer, and wherein the microwave absorbing polymer is treated with said foaming agent prior to expansion using microwave energy.

12. The method of claim 1, wherein said support layer comprises glass mat reinforced thermoplastic.

13. The method of claim 1, further comprising shaping the composite body under pressure during MW-treatment.

14. The method of claim 1, further comprising the step of pre-forming the support layer together with the porous layer under pressure prior to irradiation with MW-energy.

15. The method of claim 14, wherein the composite body further comprises a cover layer, and wherein said cover layer is pre-formed together with the support layer and the porous layer.

16. A method for manufacturing an at least two-layered composite body having a support layer consisting primarily of a microwave-permeable polymer and having a porous layer made from an expanded microwave absorbing polymer, the method comprising the steps of:
   a) forming a non-bound loose compound between microwave absorbing thermoplastic polymer particles and a microwave-permeable thermoplastic polymer;
   b) irradiating said loose compound of step a) with microwaves to directly melt together surfaces of said particles and to melt the microwave-permeable thermoplastic polymer adjacent to the particles via heat conduction form the particles; and
   c) cooling, following step b), said compound to weld together the support layer and the porous layer.

17. The method of claim 16, further comprising the step of: a2) treating said particles with a foaming agent to expand said particles through irradiation with microwave energy.

18. The method of claim 16, further comprising the step of: a2) pre-expanding said particles, wherein said pre-expanded particles are fully expanded through irradiation with microwave energy in step b).

19. The method of claim 16, wherein the support layer and the porous layer consist essentially of a same polymer.

20. The method of claim 16, wherein irradiation with MW-energy leads to formation of a closed, integral skin on a free surface of the porous layer.

21. The method of claim 16, further comprising the step of partially covering a free surface of the porous layer with a microwave impermeable layer.

22. The method of claim 16, further comprising the step of partially covering a free surface of the porous layer with a layer having a variable MW-absorption coefficient in a plane of said layer.

23. The method of claim 16, further comprising the steps of:
introducing an additional substantially microwave-permeable thermoplastic layer onto a free surface of the porous layer; and
welding together said additional thermoplastic layer and the porous layer through irradiation with microwave energies by melting a region of said additional thermoplastic layer bordering the porous layer.

24. The method of claim 23, wherein said additional thermoplastic layer comprises a same polymer as the porous layer.

25. The method of claim 16, wherein the support layer is a plate or a foil.

26. The method of claim 16, wherein the support layer comprises a hollow body partially filled with the microwave absorbing polymer, and further comprising the step of treating the microwave absorbing polymer with foaming agent prior to expansion using microwave energy.

27. The method of claim 16, wherein said support layer comprises glass mat reinforced thermoplastic.

28. The method of claim 16, further comprising shaping the composite body under pressure during MW-treatment.

29. The method of claim 16, further comprising the step of pre-forming the support layer together with the porous layer under pressure prior to irradiation with MW-energy.

30. The method of claim 29, wherein the compose body further comprises a cover layer, and wherein said cover layer is pre-formed together with the support layer and the porous layer.

* * * * *